(12) United States Patent
Wisniewski et al.

(10) Patent No.: US 8,807,590 B2
(45) Date of Patent: Aug. 19, 2014

(54) MULTI-LAYER VEHICLE AIRBAG COVERINGS

(75) Inventors: Aaron Wisniewski, Plymouth, MI (US); Mathew Barr, Clarkston, MI (US)

(73) Assignee: Faurecia Interior Systems, Inc, Auburn Hills, MI (US)

( * ) Notice: Subject to any disclaimer, the term of this patent is extended or adjusted under 35 U.S.C. 154(b) by 0 days.

(21) Appl. No.: 13/215,316

(22) Filed: Aug. 23, 2011

(65) Prior Publication Data

US 2013/0049335 A1    Feb. 28, 2013

(51) Int. Cl.
| | |
|---|---|
| *B60R 21/20* | (2011.01) |
| *B60R 21/2165* | (2011.01) |
| *B32B 27/00* | (2006.01) |
| *B32B 5/06* | (2006.01) |
| *B29C 59/00* | (2006.01) |

(52) U.S. Cl.
CPC ....... *B60R 21/2165* (2013.01); *B29C 2791/009* (2013.01); *B29C 59/007* (2013.01); *B60R 2021/21654* (2013.01); *B32B 5/06* (2013.01)
USPC ...................... 280/728.3; 280/732; 428/310.5

(58) Field of Classification Search
USPC .............................. 280/728.3, 732; 428/310.5
See application file for complete search history.

(56) References Cited

U.S. PATENT DOCUMENTS

| | | | |
|---|---|---|---|
| 4,246,213 A * | 1/1981 | Takamatsu et al. ........... 264/46.7 |
| 5,590,903 A * | 1/1997 | Phillion et al. .............. 280/728.3 |
| 5,629,085 A * | 5/1997 | Ito et al. ...................... 428/318.6 |
| 5,845,929 A | 12/1998 | Schlett et al. |
| 6,451,223 B1 | 9/2002 | Jeon |
| 6,652,034 B1 | 11/2003 | Schramm et al. |
| 8,043,683 B2 * | 10/2011 | Buhring et al. .................. 428/43 |
| 2003/0015860 A1 * | 1/2003 | Shah et al. .................. 280/728.3 |
| 2004/0173999 A1 * | 9/2004 | Thomas et al. ............ 280/728.3 |
| 2005/0058824 A1 * | 3/2005 | Fujimoto .................... 428/316.6 |
| 2005/0225062 A1 * | 10/2005 | Dumbrique .................. 280/728.3 |
| 2006/0082106 A1 * | 4/2006 | Hier et al. ................... 280/728.3 |
| 2006/0220354 A1 * | 10/2006 | Geltinger et al. .......... 280/728.3 |

(Continued)

FOREIGN PATENT DOCUMENTS

| | | |
|---|---|---|
| DE | 3712926 A1 * | 11/1988 |
| DE | 40 05 624 A1 * | 8/1991 |

(Continued)

OTHER PUBLICATIONS

European Search Report for corresponding application No. EP 12 18 0494, Nov. 15, 2012, 2 pages.

*Primary Examiner* — Ruth Ilan
(74) *Attorney, Agent, or Firm* — Reising Ethington P.C.

(57) ABSTRACT

A panel for use over a vehicle airbag includes a multi-layer covering disposed over a substrate outer surface. The covering includes a decorative skin layer and a foam layer between the substrate and the skin layer. The covering also includes a tear seam provided at a pre-determined location for an airbag deployment opening. The foam layer has one or more material properties that vary between the substrate and the skin layer. The density of an outside layer of the foam layer may be greater than the density of an inside layer of the foam layer to improve tear seam function. The covering layers may be bonded to each other without the use of additional adhesive material. The tear seam may be formed by laser scoring and may have at least a portion that extends into the foam layer and may further extend into the skin layer.

17 Claims, 1 Drawing Sheet

(56) References Cited

U.S. PATENT DOCUMENTS

| | | | |
|---|---|---|---|
| 2006/0261578 A1* | 11/2006 | Cowelchuk et al. | 280/728.3 |
| 2008/0131643 A1 | 6/2008 | Schlemmer et al. | |
| 2009/0267254 A1* | 10/2009 | Nishikawa et al. | 264/46.4 |
| 2009/0304973 A1* | 12/2009 | Buhring et al. | 428/43 |
| 2009/0317603 A1* | 12/2009 | Buhring et al. | 428/195.1 |
| 2011/0062687 A1 | 3/2011 | Matsuda et al. | |

FOREIGN PATENT DOCUMENTS

| | | | |
|---|---|---|---|
| EP | 0395814 A2 | * | 11/1990 |
| EP | 2281723 A1 | | 2/2011 |
| FR | 2923759 A1 | | 5/2009 |
| JP | 7-323801 A | * | 12/1995 |
| JP | 11-348708 A | * | 12/1999 |
| JP | 2010-47215 A | * | 3/2010 |
| WO | WO2008083871 A2 | | 7/2008 |

* cited by examiner

MULTI-LAYER VEHICLE AIRBAG COVERINGS

TECHNICAL FIELD

The present disclosure relates generally to panels and coverings having tear seams for use over vehicle airbags.

BACKGROUND

Vehicle airbags are safety devices that deploy toward the interior of a vehicle to help protect its occupants from injury in the event of a crash. Airbags may be concealed behind or beneath an interior panel during normal vehicle operation until such an event. When the airbag deploys, it typically does so through a deployment opening formed in or around the interior panel. The deployment opening may be pre-formed in the panel, the panel may move away to reveal the opening, or the opening may be formed during airbag deployment at a pre-determined location in the panel. Where formed during deployment, a tear seam may be provided in one or more components of the panel to at least partially define the pre-determined location of the opening.

U.S. Patent Application Publication No. 2011/0062687 by Matsuda et al. describes a panel construction for use with an airbag, where a substrate member fractures at a tear line formed in the substrate member to form an airbag door. A foam layer is attached to the substrate member with hot melt adhesive, and an outer skin is attached to the foam layer with hot melt adhesive. Matsuda purports to eliminate the need for a tear line in the foam layer and outer skin by controlling the peel strength provided by the hot melt adhesives and by setting the outer skin single body fracture strength and elongation at break to values within particular ranges.

SUMMARY

According to one embodiment, a panel is provided for use over a vehicle airbag. The panel includes a substrate having an outer surface and a covering. The covering includes a foam layer disposed over the outer surface of the substrate. The foam layer includes an inner surface that faces the substrate and an opposite outer surface. The covering also includes a decorative skin layer disposed over the outer surface of the foam layer. The panel further includes a tear seam at least partially formed in the covering at a pre-determined airbag deployment opening location. The foam layer includes a density that varies from the foam layer inner surface to the foam layer outer surface.

According to another embodiment, a method of making a panel for use over a vehicle airbag includes the steps of: (a) providing a substrate having an outer surface; (b) providing a covering including a variable density foam layer bonded to a decorative skin layer; (c) disposing the covering over the outer surface of the substrate so that the foam layer faces the substrate; and (d) forming a tear seam in the covering at a pre-determined airbag deployment opening location.

DESCRIPTION OF THE DRAWINGS

One or more embodiments will hereinafter be described in conjunction with the appended drawings, wherein like designations denote like elements, and wherein.

DETAILED DESCRIPTION OF THE PREFERRED EMBODIMENT(S)

As will be apparent from the following disclosure, airbag coverings may be constructed with multiple layers of materials to advantageously affect the aesthetic look and feel of the coverings while also providing enhanced tear seam functionality. Certain material properties of each of the material layers may be selected in accordance with the teachings presented herein to achieve these and/or other advantages. It is noted that the appended drawings are not necessarily to scale and that any cross-hatching shown is provided for clarity in distinguishing among different components and is not meant to limit the types of materials that may be used for each component.

Figure 1:
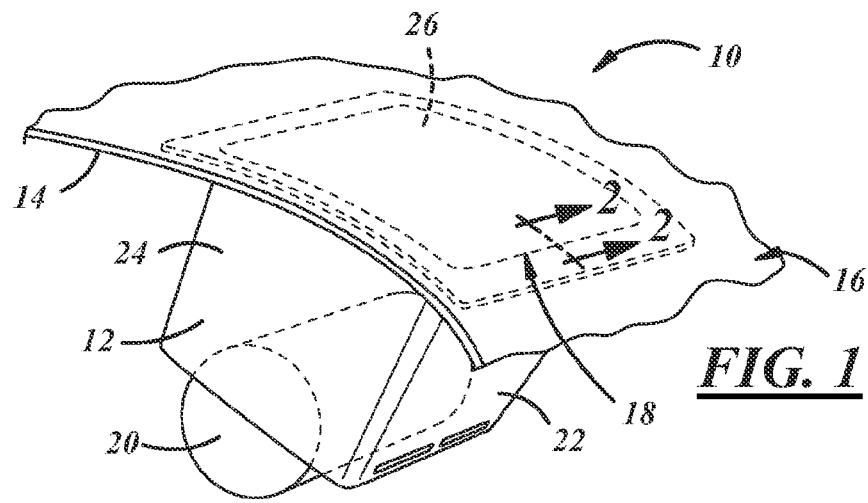
FIG. 1 is a cutaway view of an instrument panel with a non-visible tear seam arranged over an airbag module.

Referring now to FIG. 1, a cut-away view of an exemplary vehicle instrument panel 10 is shown with an airbag module 12 installed therebeneath. Instrument panel 10 includes one or more layers of materials, and each layer may include its own separately weakened portion or tear seam for the formation of airbag deployment openings in each layer that may together form a deployment opening through the overall panel. The portion of instrument panel 10 shown in the figure is a passenger side of the instrument panel 10 and includes substrate 14, covering 16, and tear seam 18. Tear seam 18 is a non-visible tear seam in this example. The particular tear seam 18 shown is generally rectangular and located to correspond with underlying airbag module components. The tear seam may assume other known shapes, such as a U-shape, H-shape, or X-shape, to name a few examples. A vehicle passenger side airbag is used only as an example of one type of airbag that may benefit from the following disclosure, and any type of panel for use over a vehicle airbag can be used in accordance with these teachings.

Airbag module 12 is any component or device that includes an airbag arranged to deploy into the cabin of a vehicle when inflated. In this embodiment, airbag module 12 includes an airbag canister 20 and a housing 22. An airbag deploys from canister 20 toward panel 10 and the vehicle interior when necessary. The housing 22 supports the airbag canister 20 beneath instrument panel 10 and may include a chute 24 that helps to guide the airbag during deployment. This is only one version of an airbag module, while other modules may not include a canister or a separate housing and may include other types of components to compliment the functionality of the airbag. In the particular embodiments shown in FIGS. 1-3, an airbag door 26 is formed from the portion of substrate 14 lying inboard of the tear seam 18 during airbag deployment when the tear seam functions to form the deployment opening.

Figure 2:
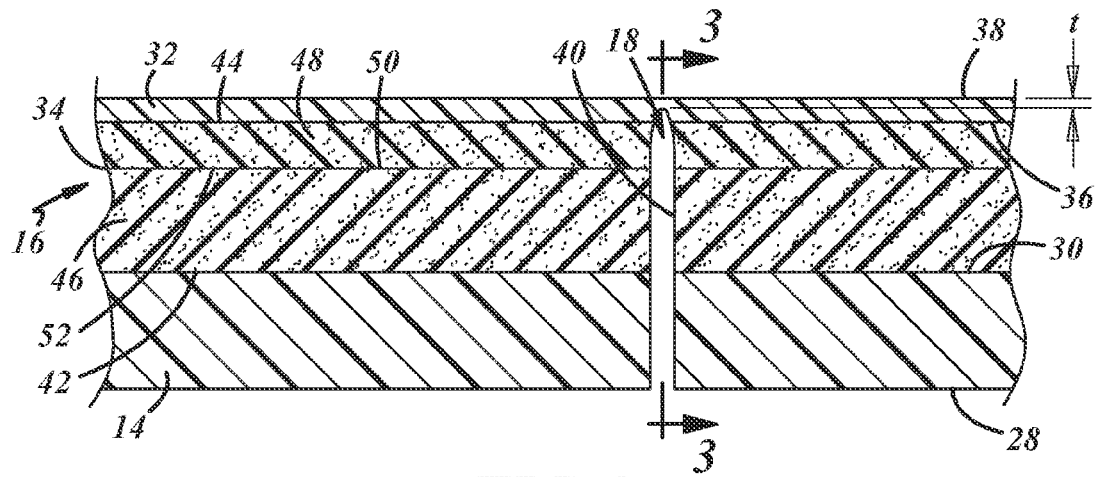
FIG. 2 is an enlarged cross-sectional view of a portion of the instrument panel of FIG. 1 showing a multi-layer covering and a tear seam.
Figure 3:
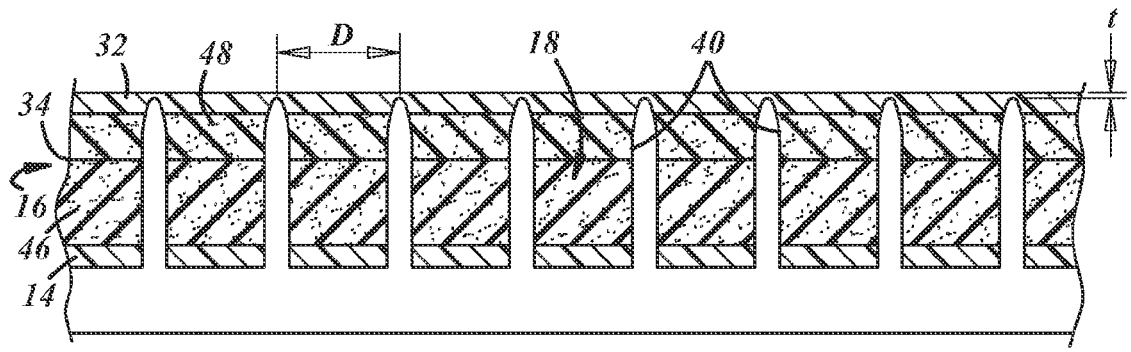
FIG. 3 is a cross-sectional view along the tear seam of FIG. 2 showing a plurality of cuts arranged along the tear seam.

FIG. 2 is a partial cross-sectional view of the instrument panel of FIG. 1 showing substrate 14, covering 16, and tear seam 18. Substrate 14 is the base component of instrument panel 10 to which other components may be attached and/or extend from for functional or aesthetic purposes and includes inner and outer surfaces 28 and 30. The thickness of the substrate generally ranges from 2.0 mm to 4.0 mm for polymer-based materials such as filled or unfilled thermoplastic materials. Examples of suitable materials include polyolefin-based materials, like polypropylene or thermoplastic olefins (TPOs), or other thermoplastics such as ABS, ABS/PC, nylon, etc. Suitable substrate filler materials include short or long glass fibers or mineral-based fillers. Polypropylene having filler material including long glass fibers in an amount of 20-30% by weight is one example of a suitable substrate material, but other polymeric or non-polymeric materials or composites may be used.

Covering 16 overlies substrate 14 and may be provided for decorative purposes. In the particular embodiment of FIG. 2, covering 16 is a multi-layer covering that includes a skin layer 32 and a foam layer 34. Foam layer 34 may include one or more material properties that vary or change across its thickness to improve tear seam function, as will be described in greater detail below. Skin layer 32 is generally decorative and includes inner surface 36 and opposite outer surface 38, where outer surface 38 is also the visible outer surface of the covering 16. Skin layer 32 may be constructed from relatively pliable materials such as TPOs, thermoplastic elastomers (TPEs), polyvinylchloride (PVC), thermoplastic polyurethanes (PURs), leather, simulated leather, or other types. Material selection may be based on a number of factors, including the desired type of texture, the tactile feeling of the material, cost, processability, or other factors. Olefin-based materials such as TPOs or other polymers based on ethylene, propylene, butylene, or butadiene or blends, alloys, or copolymers thereof may be desirable due to their low cost, low density, and wide available ranges of properties. The thickness of skin layer 32 may range from about 0.2 mm to about 1.0 mm, and preferably ranges from about 0.3 mm to about 0.7 mm. Certain combinations of skin layer material type and thickness, such as relatively thin TPO skin layers, may be advantageous to provide a tactile feel that simulates the feel of more expensive materials such as leather.

Foam layer 34 is a layer located between the substrate 14 and the skin layer 32, and may be attached to one or both. Foam layer 34 may be included to provide a softer tactile feel to the covering 16 and to the overall instrument panel than would be provided if the skin layer was in direct contact with the substrate 14, which may be more rigid. Foam layer 34 may also help level uneven areas in the underlying substrate, conceal substrate features, and provide more structure to skin layers that may otherwise be too thin and/or flexible to be practically handled in a manufacturing environment. Foam layer 34 may be constructed from one or more compressible but resilient foam materials, such as polyolefin-based (e.g., PP or TPO) foam, polyurethane foam, acrylic-based foam, or polyester foam, to name a few. Some of these materials may be cross-linked for additional resilience and may include open- or closed-cell structures. Different skin and foam layer thicknesses may be combined to form coverings having thicknesses ranging anywhere from about 0.2 mm (where the foam layer is omitted) up to about 6.0 mm or more. For example, a skin layer 32 ranging in thickness from about 0.4 mm to about 0.6 mm may be attached to a foam layer 34 ranging from about 3.5 mm to about 4.5 mm to form a covering 16 having a thickness ranging from about 3.9 mm to about 5.1 mm. Other exemplary thicknesses will be described in more detail below. An all-olefin instrument panel may be provided by selecting olefin-based materials for the substrate 14, the skin layer 32, and the foam layer 34, which may be advantageous for vehicle end-of-life material recycling.

Tear seam 18 may include any of various types of cuts, scores, notches, or other types of stress concentrators that are formed in one or more layers of the panel 10 to at least partially define the location of the airbag deployment opening when the airbag inflates. In the embodiment shown in FIGS. 2 and 3, tear seam 18 includes a plurality of cuts 40 extending at least partially into an inner surface 42 of the covering. In particular, the cuts 40 shown in the figures extend partially into skin layer 32 at the inner surface 36 of the skin layer. The particular geometry of cuts 40 shown in the figures, generally columnar or cylindrical, may be formed by laser cutting. Each cut 40 may be formed a distance D from the next consecutive cut, and D may be constant or variable. The depth of each cut may define a residual wall thickness, or RWT, shown as t in FIGS. 2 and 3. Here, the RWT includes only a portion of skin layer 32 at each cut, but some cuts may define a RWT that includes both the skin layer 32 and at least a portion of the foam layer 34. While shown formed generally perpendicular to the various layer surfaces, one or more of the cuts 40, or an entire continuous tear seam cut in the shape of the desired deployment opening, may be formed at any angle with surfaces of the various layers. The type of tear seam 18 shown in FIGS. 2 and 3 may behave like perforations during airbag deployment such that the covering 16 tears along the minimum RWT locations to form the deployment opening. RWT values may range from about 0.15 mm to about 0.5 mm, depending on the types of materials used in the covering 16 or on other factors. It has been found that utilizing the variable property foam layers described below may contribute to the ability to reduce RWT values, which may further enhance the function of the tear seam, as will be explained below. Again, tear seam 18 is only illustrative, as any other type of tear seam known in the art in any one or more of the panel layers may be used in conjunction with the multi-layer coverings disclosed herein.

Turning back to FIG. 2, foam layer 34 includes inner surface 42 and an opposite outer surface 44. Inner surface 42 faces toward substrate 14, and outer surface 44 faces toward and/or may be bonded or otherwise attached to the inner surface 36 of skin layer 32. As noted above, foam layer 34 may include one or more material properties that vary across its thickness to realize certain aesthetic and functional advantages. For instance, the density, elongation at break, and/or modulus of elasticity of the foam layer may be different at inner surface 42 than it is at outer surface 44. In one embodiment, the density of foam layer 34 varies between inner and outer surfaces 42, 44. That is, the density is different at inner surface 42 than at outer surface 44. In particular, the density of the foam layer 34 may be higher at a portion near the outer surface 44 than at a portion near the inner surface 42. In the embodiment shown in FIG. 2, foam layer 34 includes an inside layer 46 and an outside layer 48, and the layers 46, 48 may each have a uniform density that is different from the other. For example, outside layer 48 may have a higher density than inside layer 46. The density or other material properties may vary within each individual layer of the foam layer 34 as well, and more than two layers may be included as a part of the foam layer 34. Inside layer 46 includes an outer surface 50 that may be bonded or otherwise attached to an inner surface 52 of outside layer 48. The inside layer 46 shares inner surface 42 with the overall foam layer 34 in this embodiment, and the outside layer shares outer surface 44 with the overall foam layer 34.

It has been found that such a variable density foam layer 34 may offer a more desirable panel covering aesthetic without sacrificing tear seam function. For example, in certain vehicle interior applications, the use of lower density foam materials between the substrate 14 and skin layer 32 may be desirable for a luxurious or cushion-like feel when a vehicle occupant touches the interior panel. However, some soft foam materials may have poor adhesion to certain skin layer materials and can delaminate during airbag deployment. Such delamination may absorb kinetic energy from the airbag deployment, thus taking energy away from tearing the covering 16 at the tear seam and possibly delaying full airbag deployment. While higher density foams may offer better adhesion with the same type of skin layer, and thus direct more deployment energy to the tear seam where it is desired, they may be firmer to the touch, thus sacrificing some of the cushion-like feel of the softer foams. Providing a foam layer 34 having a variable material property across its thickness as described may offer the advantages of both higher and lower density foams without sacrificing each advantage. In furtherance of this balancing of desirable aesthetic and function, the thickness of the higher density layer may be less than the thickness of the lower density layer, where discrete layers are utilized, as shown in FIG. 2. The thickness of the outside layer 48 may range from about 0.5 mm to about 1.5 mm, and is preferably from about 0.75 to about 1.25 mm, or about 1.0 mm. In some embodiments, it may be desirable to minimize the thickness of outside layer 48 as much as the manufacturing process will allow. The thickness of the inside layer 46 may make up the balance of the thickness of the foam layer 34, and may range from about 1.0 mm to about 5.0 mm, but may be provided in any amount sufficient to provide the desired feel of the finished panel.

The difference in the density between the inner and outer surfaces of foam layer 34 may be about 16 kg/m$^3$ (1 lb/ft$^3$) or more. In one embodiment, outside layer 48 has a density that is at least about 25% higher than a density of the inside layer 46. In another embodiment, outside layer 48 has a density that is at least about 50% higher than the density of inside layer 46. While described in terms of outside and inside layers, it should be appreciated that more than two layers may be used to accomplish the varying density within foam layer 34, or that foam layer 34 may comprise a single foam layer having a continuous or other density gradient that achieves similar advantages. Where more than one discrete layer is used to form foam layer 34, the outside layer 48 nearest skin layer 32 may have a density that is in a range from about 80 kg/m$^3$ (5 lb/ft$^3$) to about 500 kg/m$^3$ (30 lb/ft$^3$) and may be limited by the amount of subjective cushioning that is lost in the covering by including the higher density outside layer within foam layer 34. It may be desirable is some instances to minimize the density of the outside layer 48 to the minimum density with which the outside layer 48 maintains adhesion with the skin layer during airbag deployment. Such a density may depend on several factors and may be determined experimentally using the desired skin layer and foam layer materials and manufacturing processes.

In one embodiment, the combined density of foam layer 34, including its portions having different densities, may be about 100 kg/m$^3$ (6 lb/ft$^3$) or less. In such a construction having multiple layers of foam material within foam layer 34, one or more of the layers, such as inside layer 46 and/or outside layer 48, may have a density that is about 100 kg/m$^3$ (6 lb/ft$^3$) or less. Inside layer 46 may have a density that is at least 16 kg/m$^3$ less than the density of outside layer 48. In one embodiment, the density of the inside layer 46 of foam layer 34 ranges from about 50 kg/m$^3$ (3 lb/ft$^3$) to about 80 kg/m$^3$ (5 lb/ft$^3$) and may preferably be about 65 kg/m$^3$ (4 lb/ft$^3$). Of course, all of these density ranges and differences are non-limiting and may largely depend on the types of materials used. For example, lighter weight olefin-based foams may have overall lower densities and differences in densities than heavier polyurethane foams and different types of foams may be combined in some cases.

Other foam material properties may be selectively employed in foam layer 34 to achieve similar results or advantages. For example, forming foam layer 34 so that the elongation at break of the portion of foam material near outer surface 44 is higher than the elongation at break of the portion of foam material near inner surface 42 may offer a comparable construction to the variable density foam layers described above. Where discrete layers such as inside and outside layers 46, 48 are used to form foam layer 34, it may be useful to find the minimum elongation for outside layer 48 that will cause outside layer 48 to fail or tear simultaneously with the skin layer 32. Higher elongation outside layers may be used as well to cause the skin layer 32 and the outside layer 48 to fail together—i.e., to prevent the foam layer from tearing prematurely and directing kinetic energy from the airbag to delamination of the skin layer from the foam layer. With certain foam materials, a higher elongation at break generally correlates to a higher density. Another useful foam material property that may be selectively employed in foam layer 34 is the modulus of elasticity of the respective material, where the behavior of a higher modulus foam, or a stiffer foam, may generally correlate to the behavior of a higher density foam. Skilled artisans may determine that one or more other foam material properties may be selectively utilized and varied within foam layer 34 to achieve similar results.

Coverings having foam layers with variable properties across their thickness may additionally offer the ability to enhance tear seam function by allowing the use of lower RWT values. RWT values may typically be limited on the low end by read-through at the visible surface of the covering, but providing a foam layer having a higher stiffness, density, or elongation at break adjacent to the skin layer may sufficiently increase the combined rigidity of the covering so that sagging of the skin layer, and therefore the read through of the tear seam cuts, is reduced. Such foam layer constructions may also allow the distance D (shown in FIG. 3) between consecutive cuts along the tear seam to be reduced, which may have the effect of promoting proper covering tearing during airbag deployment. The variable property foam layers described above may be particularly useful with high elongation skin layers. For example, some skin layer materials having desirable characteristics such as a soft feel, low cost, low weight, processability, weatherability, or other characteristic may elongate up to 200% or more before breaking or tearing. Other high elongation materials may elongate up to 500% or more before breaking or tearing. Some TPO skin layer materials, for instance, may elongate up to a range from about 800% to about 1200% before breaking. While the cushion-like feel of lower density, more flexible foam materials may be desirable for use with soft-touch TPO materials, their elongation at break may be so low that the foam layer breaks too soon, leading to delamination and the accompanying misdirection of airbag kinetic energy described above.

A method of making a panel, such as an instrument panel, for use over an airbag may be described that can be used to construct one or more of the above embodiments. An illustrative method may generally include providing a substrate, providing a covering, disposing the covering over the substrate, and forming a tear seam in the covering. The substrate may be provided in any form consistent with the above description. The covering may be provided so that it includes a variable density foam layer that is bonded or otherwise attached to a decorative skin layer. This step of providing the covering may include any of various types of bonding between the skin layer inner surface and the foam layer outer surface. In one embodiment, the bonding is performed without the application of a separate adhesive layer. That is to say that it may be possible to adhesively bond the layers to each other without additional materials. For example, materials from similar material families, such as olefin-based materials, may be selected for the layers to be bonded together. The surfaces to be bonded may be heated or otherwise made to soften or become locally molten so that the layers can be pressed or laminated together. Of course, additional adhesive materials may also be applied at the interface of the surfaces to be joined.

The variable density foam layer may be provided as described above, with two or more layers of material having different densities or as a material having a density gradient. Where discrete layers are used, similar bonding methods may be used to join outside and inside layers of the foam layer as may be used to bond the skin layer and the foam layer. Higher density foam layers may sometimes bond better than lower density foam layers to other materials due to the greater amount of material available at the surface for bonding. Thus the density of the outside foam layer may be selected high enough to optimize the bond strength at the skin layer while simultaneously minimizing the density to maintain as much cushion-like feel as possible. The inner surface of the foam layer may or may not be bonded to the substrate with a suitable adhesive. The covering may also be attached to the substrate through other means such as wrapping it around the edges of the substrate and attaching it to the inner surface of the substrate.

The tear seam may be formed as described earlier in one of many forms. In one embodiment, the tear seam includes a plurality of laser cuts that are spaced apart and that extend into the covering from the inner surface of the covering and into the foam layer. One or more of the laser cuts may extend into the inner surface of the skin layer as well to minimize the RWT values for optimum tear seam function. The tear seam may be formed after the covering is disposed over and/or attached to the substrate, in one embodiment. For example, laser cuts may be formed through the substrate from the inner surface of the substrate and at least partially through the covering. In other embodiments, the tear seam may be formed in the covering prior to it being disposed over the substrate by other methods such as hot or cold knife scoring, ultrasonic scoring, machining, etching, or other suitable methods. In yet other embodiments, the tear seam may be formed in the covering after disposing it over the substrate, but formed through an opening in the substrate corresponding to a pre-formed airbag door gap.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method of making a panel for use over a vehicle airbag, comprising the steps of:
    (a) providing a substrate having an outer surface;
    (b) providing a separately formed covering having an outside foam layer bonded to a decorative skin layer and an inside foam layer bonded to the outside foam layer, wherein the outside foam layer has a uniform density greater than a density of the inside foam layer;
    (c) disposing the covering over the outer surface of the substrate so that the foam layers are between the skin layer and the substrate; and
    (d) forming a tear seam in the covering at a pre-determined airbag deployment opening location.

2. The method of claim 1, wherein said layers are bonded to one another by a lamination process in which the surfaces to be bonded are heated, made to soften or become locally molten and pressed together.

3. The method of claim 1, wherein step (d) includes laser cutting the tear seam.

4. The method of claim 1, wherein step (d) is performed after step (c).

5. The method of claim 1, wherein step (d) includes forming the tear seam at least partially into the skin layer.

6. The method of claim 1, wherein the tear seam is performed by laser cutting through foam material having a density less than 100 kg/m$^3$.

7. The method of claim 1, wherein at least one of the foam layers is formed from an olefin-based material.

8. The method of claim 1, wherein the outside foam layer is formed from a material having better adhesion with the skin layer than does the material of the inside foam layer.

9. The method of claim 1, wherein at least one of the foam layers has a density less than 100 kg/m$^3$.

10. The method of claim 1, wherein at least a portion of the tear seam is formed through both of the foam layers and partially into the skin layer.

11. The method of claim 1, wherein the outside foam layer is bonded to the decorative skin layer at an interface where the bond is sufficiently strong to prevent delamination of the skin layer from the outside foam layer during airbag deployment.

12. The method of claim 1, wherein the inside foam layer has a uniform density.

13. The method of claim 1, wherein the inside foam layer forms an inner surface of the covering.

14. The method of claim 1, wherein a thickness of the outside foam layer is less than a thickness of the inside foam layer.

15. The method of claim 1, wherein the density of the outside foam layer is at least 25% greater than the density of the inside foam layer.

16. The method of claim 1, wherein at least a portion of the tear seam is formed in one or both of the foam layers.

17. The method of claim 1, wherein the skin layer is formed from a material having an elongation at break that is greater than about 200%.

* * * * *